Patented Feb. 21, 1950

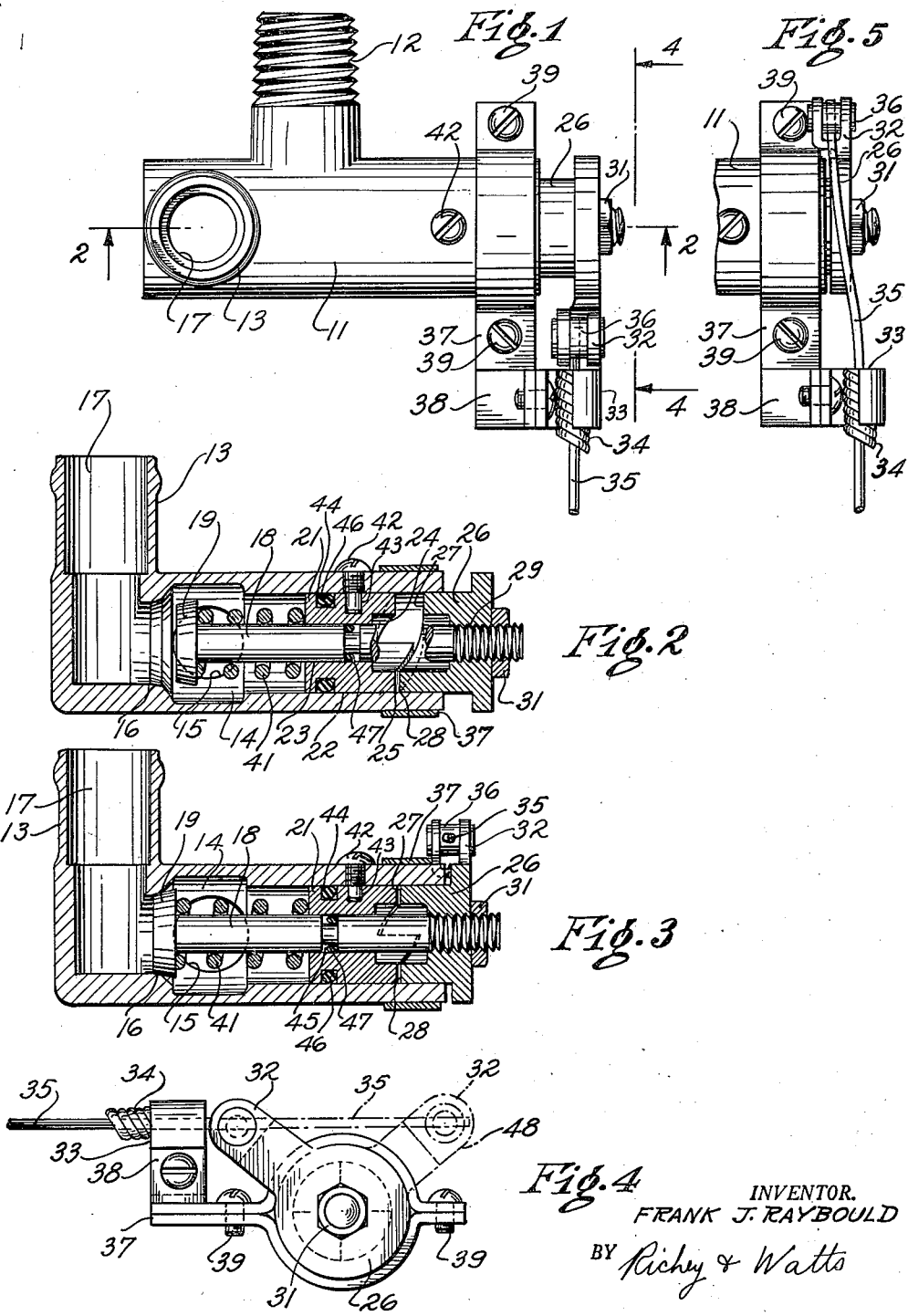

2,498,608

UNITED STATES PATENT OFFICE 2,498,608

VALVE

Frank J. Raybould, Lakewood, Ohio, assignor to The Weatherhead Company, Cleveland, Ohio, a corporation of Ohio Application July 3, 1945, Serial No. 603,001

2 Claims. (Cl. 251—132)

My invention relates to valves.

An object of my invention is to provide an inexpensive, readily manufactured and assembled valve, preferably one having self-contained operating mechanism.

A further object of my invention is to provide a quick-acting valve. Another object of my invention is to provide a valve which may be operated remotely. A further object is to provide a valve which may be operated by motion of a Bowden wire and to provide means for introducing a motion reduction between the wire and the valve for enabling relatively small movement of the valve disc to be produced by a considerable longitudinal motion of the Bowden wire.

A further object of my invention is to provide a remotely operated valve with a fine adjustment. A further object of my invention is to provide a cam-operated valve.

Other and further objects, features and advantages of the invention will become apparent as the description proceeds.

In carrying out the invention in a preferred form thereof, a valve body is provided having a central bore with a valve seat at one end thereof. There is a valve disc carried by an axially movable valve stem. A block is provided in the valve body having a helical cam surface and a co-axial bore for both supporting the valve stem slidably in said bore, and providing for the control thereof.

For operating the valve stem and moving it longitudinally, a rotatably mounted valve operator formed as a helical cam is provided. The cam is secured to the valve stem with the cam surface adapted to bear against the helical surface of the valve block whereby rotation of the cam causes opening or closing of the valve. For rotating the cam from a distance, a crank or operating lever is secured thereto, and a Bowden wire is provided having the end of the wire secured pivotally to the crank or operating lever.

A better understanding of the invention will be afforded by the following detailed description considered in conjunction with the accompanying drawing and the scope of the invention will be set forth in the claims appended hereto.

In the drawing:

Fig. 1 is a plan view of a valve forming an embodiment of my invention with the parts represented in the valve-open position;

Fig. 2 is a medial longitudinal sectional view of the apparatus of Fig. 1 taken along a plane 2—2 with the operating mechanism represented in the position in which the valve is open;

Fig. 3 is a view corresponding to Fig. 2 with the mechanism shown in the valve-closed position;

Fig. 4 is an end view of the apparatus of Figs. 1 to 3 showing the valve-operating mechanism in both open and closed positions; and Fig. 5 is a fragmentary view of the portion of Fig. 1 showing the valve operating crank and Bowden wire in the valve-closed position.

Like reference characters are utilized throughout the drawing to designate like parts.

The apparatus shown by way of illustration in the drawings comprises a hollow valve body 11 having a threaded nipple 12 which may be secured to piping, and an unthreaded nipple 13 adapted to receive a hose connection. The connections 12 and 13 serve as inlet and outlet connections or vice-versa.

In the arrangement illustrated, the valve body 11 is substantially cylindrical except for the connections for the inlet and outlet openings, and has a bore substantially co-axial with the cylindrical portion of the body 11. The bore has a portion 14, preferably enlarged, adjacent the opening 15 communicating with the nipple 12, and a valve seat 16 is formed at the end of the bore portion 14 toward the end of the valve body 11 communicating with the opening 17. An axially movable valve stem 18 is provided carrying a valve disc 19 adapted to engage or fit in the valve seat 16. Preferably the confronting surfaces of the valve disc 19 and the valve seat 16 are conical with a relative small taper.

For movably supporting the valve stem 18 with freedom to rotate or slide axially, a block 21 is provided having a cylindrical outer surface fitting the cylindrical bore 22 of the valve body 11, and having an opening 23 therein co-axial with respect to the valve body 11 for receiving the valve stem 18. The outer end of the block 21 is shaped with an appropriate cam surface, preferably a helical cam with one or more lead threads. Preferably, a two-lead thread is utilized embracing two cam surfaces or helical surfaces 24 and 25, each 180° in angular length. For operating the valve stem 18 and moving it axially, a rotatably mounted helical cam 26 is provided having a cam surface adapted to cooperate with the cam surface of the outer end of the block 21. In the specific arrangement illustrated the rotatable cam 26 comprises a cylindrical block adapted to rotate within the cylindrical bore 22 of the valve body 11, and having a pair 180° two-lead threads or cam surfaces 27 and 28 adapted to ride on the surfaces 24 and 25 respectively of the valve block 21.

The rotary helical cam 26 is co-axial with the valve stem 18 and secured thereto in a suitable manner; for example, in the arrangement illustrated, the cam 26 has a threaded bore 29 and the outer end of the valve stem 18 is threaded to receive the cam 26, a lock nut 31 being provided to secure the cam 26 on the thread 29 of the stem 18.

To facilitate remote operation of the rotary cam 26 it is preferably formed with an ear or extending crank 32, and a Bowden wire linkage 33 is provided having a sheath 34 enclosing a flexible wire 35. The end of the wire 35 is secured to a pin 36 pivoted in the end of the crank 32, which is preferably forked as illustrated in Figs. 3 and 5. For securing the sheath 34 and the Bowden wire linkage 35 to the valve body 11, suitable means such as a split clamp 37 is provided carrying a bracket clamp 38 for gripping the end of the Bowden wire sheath 34. Suitable means such as a pair of tightening screws 39 may be provided for causing the clamp 37 to grip the outer surface of the valve body 11.

Preferably means are provided for biasing the valve disc 19 to one position, which is the closed position in the construction shown. In the arrangement illustrated, a helical compression spring 41 is provided which surrounds the stem 18 and fits between the valve disc 19 and the block 21 for urging the valve disc 19 into the closed position.

Suitable means are provided for removably securing the valve block 21 in the bore 22 such as a set screw 42 threaded through the valve body 11 into a socket 43 cut into the valve block 21. Suitable sealing means are preferably provided for preventing leakage of fluid such as air, steam, or hot water, for example, between the valve block 21 and the inner surface of the valve body 11 as well as between the bore 23 in the block 21 and the valve stem 18. To this end the block 21 and the stem 18 may be provided with annular slots or grooves 44 and 45 respectively adapted to receive suitable sealing rings 46 and 47, respectively. Preferably, the O-ring type of seal is utilized in which the slot has a greater axial length than radial depth, the uncompressed diameter of the sealing ring is greater than the depth than the slot receiving it, and the cross-sectional area of the slot is greater than the cross-sectional area of the sealing ring. The sealing ring is preferably composed of suitable resilient material such as rubber or synthetic similar in nature to rubber.

The construction is so inexpensive that the valve may profitably be employed in connection with the control of hot water heaters for automobiles, for example. However, the use of the valve is not limited thereto, and I believe such a valve will be useful wherever remote fluid control is desired, such as in the aircraft field for pneumatic controls, for example.

The Bowden wire operating mechanism is preferably so arranged as to produce a range of motion of the operating lever or crank 32 slightly exceeding 90°. As illustrated in Fig. 4, the operating crank 32 is adapted to be moved from the open position, shown in full lines, to a closed position, represented in dashed lines 48. The lead of the helical cam surfaces 24, 25, 27 and 28 is such that the valve stem 18 is moved axially from the fully closed to the fully opened position and vice versa by the range of motion of the Bowden wire 35 represented by the angular motion of the crank 32 as shown in Fig. 4.

It will be observed that the longitudinal motion of the Bowden wire 35 when traveling between the open and closed positions of the crank 32 represented in Fig. 4, is materially greater than the axial motion of the valve stem 18, and consequently a finer control or adjustment of the valve stem 18 and a closer control of the amount of fluid allowed to pass through the valve is obtained than would be possible if a direct connection between the Bowden wire 35 and the valve stem 18 were provided. Nevertheless, the construction is relatively simple and the parts are relatively inexpensive, readily fabricated and assembled. Operation by relatively simple operating means such as a Bowden wire is readily obtained, and furthermore very wide length tolerances are permissible between the face of the valve and the valve orifice or seat 16 in the valve body 11.

The valve block 21 and the rotatable cam 26 may be composed of suitable substances such as either die cast metal or moulded plastic, for example.

Although I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What is claimed is:

1. A valve comprising a valve body having inlet and outlet ports and a valve seat therebetween, a bore in said body leading to said valve seat and having an axially outer cylindrical wall portion concentric with said valve seat, a plug slidable axially into said bore, means securing said plug in said bore with the plug spaced axially outwardly from said valve seat, a circumferential groove in said plug and a sealing member in said groove sealing against the wall of said bore, an axial aperture in said plug, a valve disc adjacent said valve seat, a valve stem slidably extending from said valve disc through the aperture in said plug, sealing means between said stem and plug, cam means formed on the axially outer end of said plug, a cam member removably secured to an outer portion of said stem and having cam means complementary to and in engagement with the cam means of said plug, spring means for urging said valve disc against its seat, and means to rotate said cam member to cause said valve to open.

2. A valve comprising a valve body having inlet and outlet ports and a valve seat therebetween, a bore in said body leading to said valve seat and having an axially outer cylindrical wall portion concentric with said valve seat, a plug slidable axially into said bore, means securing said plug in said bore with the plug spaced axially outwardly from said valve seat, a circumferential groove in said plug and a sealing member in said groove sealing against the wall of said bore, an axial aperture in said plug, a valve disc adjacent said valve seat, a valve stem slidably extending from said valve disc through the aperture in said plug, sealing means between said stem and plug, cam means formed on the axially outer end of said plug, a cam member removably secured to an outer portion of said stem, said cam member having a portion extending into and fitting said bore, said portion terminating in cam means complementary to and in engagement with the cam means of said plug, spring means for urging said valve disc against its seat, and means to rotate said cam member to cause said valve to open.

FRANK J. RAYBOULD.

REFERENCES CITED

The following references are of record in the file of this patent:

UNITED STATES PATENTS

| Number | Name | Date |
| --- | --- | --- |
| 441,682 | Mitchell | Dec. 2, 1890 |
| 710,945 | Bunting | Oct. 14, 1902 |
| 807,309 | Ott | Dec. 12, 1905 |
| 1,713,102 | Stedwell | May 14, 1929 |
| 1,846,446 | Maynard | Feb. 23, 1932 |
| 2,011,123 | Shilson | Aug. 13, 1935 |
| 2,392,800 | Osburn | Jan. 8, 1946 |